Dec. 9, 1952     T. W. CLIFFORD     2,620,712
SHUTTER AND LENS MOUNT CONSTRUCTION FOR PHOTOGRAPHIC CAMERAS
Filed May 17, 1950     3 Sheets-Sheet 1

Inventor:—
Thomas William Clifford,
by Pierce, Scheffler & Parker,
Attorneys.

Dec. 9, 1952 T. W. CLIFFORD 2,620,712
SHUTTER AND LENS MOUNT CONSTRUCTION FOR PHOTOGRAPHIC CAMERAS
Filed May 17, 1950 3 Sheets-Sheet 2

Inventor:-
Thomas William Clifford,
by Pierce, Scheffler & Parker,
Attorneys.

Patented Dec. 9, 1952

2,620,712

UNITED STATES PATENT OFFICE 2,620,712

SHUTTER AND LENS MOUNT CONSTRUCTION FOR PHOTOGRAPHIC CAMERAS

Thomas William Clifford, Leicester, England, assignor to Taylor, Taylor & Hobson Limited, Leicester, England, a British company Application May 17, 1950, Serial No. 162,468
In Great Britain May 24, 1949

10 Claims. (Cl. 95—11)

This invention relates to improvements in photographic cameras and in particular to cameras provided with interchangeable lenses having between-lens shutters.

To meet the increasing demand for flashlight photography, especially in the amateur field, the need arises for a simple type of camera of this kind.

One object of this invention is, therefore, the provision of a photographic camera in which the minimum number of shutter parts is built in between the lenses.

A further object of the invention is the provision of a photographic camera having interchangeable lenses in which the minimum number of shutter parts is built into the lens mount enabling a simple and quick interchange to be made of the different lenses.

A still further object of the invention is the provision of a photographic camera in which the number of shutter parts which are built into the lens mount, in addition to the iris, is reduced to a minimum and comprises a set of shutter blades and means coupling the said blades to the shutter operating mechanism which is built into the camera body itself and embodies the driving and timing means.

With a camera constructed in this manner a set of interchangeable lenses can be used consisting, by way of example, of a 50 mm. wide-angle lens, an 80 mm. f/2.8 lens and a 160 mm. long focus lens. Such a set of lenses can be readily interchanged on the camera without awkward coupling to the various shutter controls, and can be used very conveniently with different types of flashlamp.

In order that the present invention may be clearly understood and readily carried into effect it will now be described, by way of example, with reference to the accompanying drawings, wherein.

Figure 4:
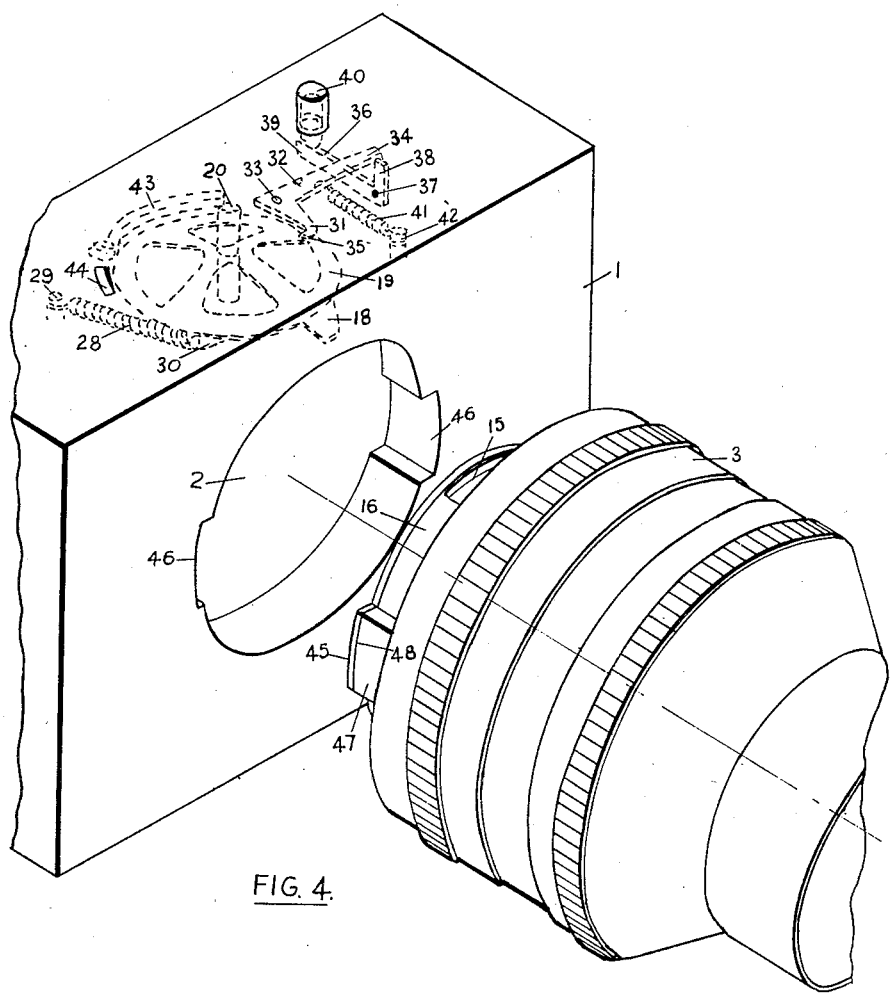
Figure 5:
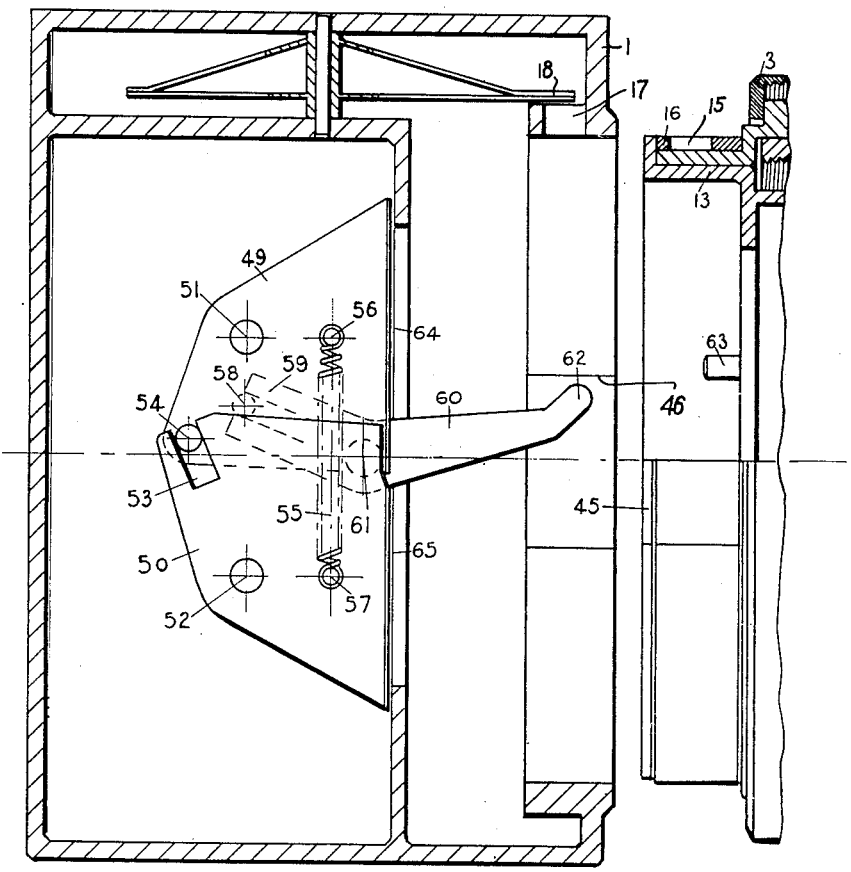

Fig. 4 is a perspective view showing a lens mount, the camera body carrying the shutter operating mechanism, and bayonet means by which the lens mount is fitted to the camera body, the means coupling the between-lens shutter to the shutter operating mechanism being omitted for simplicity of illustration, and Fig. 5 shows details of a cover flap device operated by insertion and removal of the lens mount which protects the light sensitive photographic material during these operations.

Referring now to the accompanying drawings, these illustrate a photographic camera having interchangeable lenses with between-lens shutters and embodying the present invention.

As shown to best advantage by Figs. 1 and 4 the camera body 1 has an opening 2 which accommodates a lens mount 3, the different lens mounts being held in position by means of a bayonet fitting, described in greater detail hereinafter with reference to Fig. 4.

Figure 1:
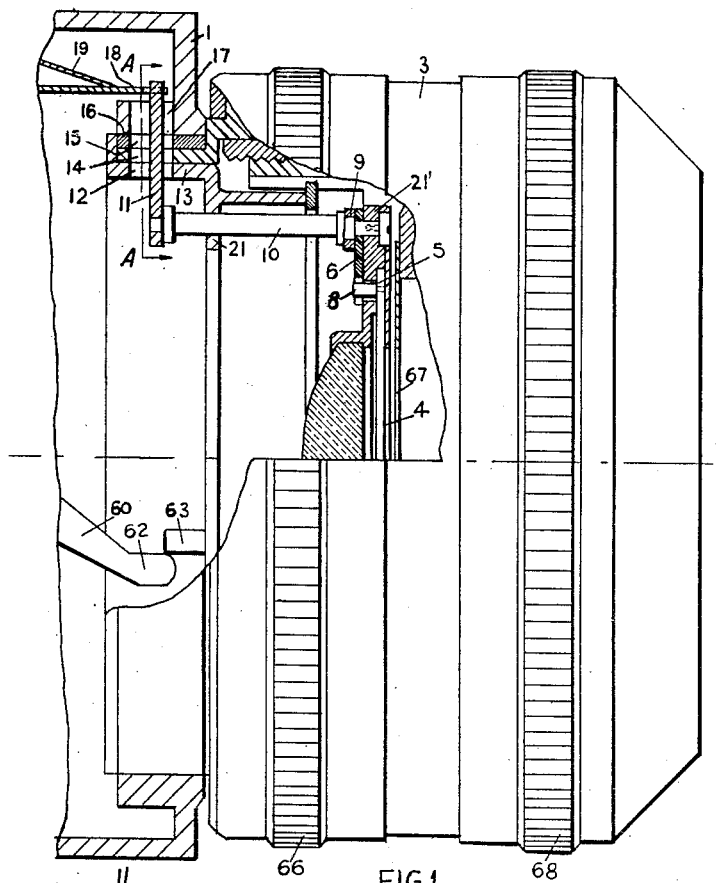
Fig. 1 is a side view, partly broken away, of a photographic camera showing the coupling between the lens mount and the camera body.
Figure 3:
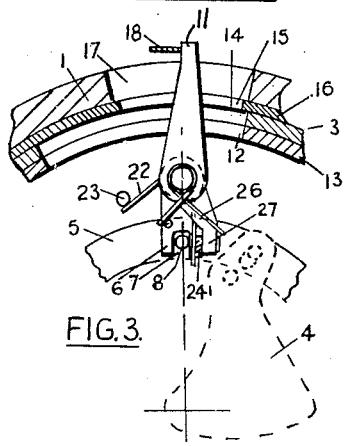
Fig. 3 is a view taken on the line A—A in Fig 1, showing details of the coupling between the shutter blades and the operating mechanism carried by the camera body.
Figure 2:
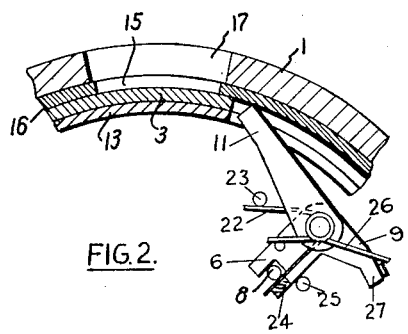
Fig. 2 is a view showing details of the mechanism in the lens mount forming the coupling means between the shutter blades and the operating mechanism in the position occupied whilst the lens mount is being fitted to or removed from the camera.

The number of shutter parts which are built into the individual lens mounts, in addition to the iris, is reduced to a minimum as shown in Figs. 1 to 3. These parts comprise a set of shutter blades 4, a shutter blade ring 5, a spring loaded arm 6 coupled to the ring 5 by means of a slot 7 which engages a pin 8 integral with the said ring, and a lever 9 mounted adjacent to the arm 6 on a small shaft 10 which carries a second lever 11 at the end opposite to the lever 9.

Each individual lens mount 3 has its own focusing device and a normal type of iris 67 which, as viewed from the front of the lens, is mounted in front of the shutter blades 4 and operated in the usual way.

Fig. 2 shows the internal position in which the lever 11 is held whilst the lens mount is being fitted to or removed from the camera.

In the fitted position the shutter blades 4 (Fig. 3) and blade operating ring 5 are normally so placed that the lever 11 projects through a slot 12 in a lens mount member 13, slot 14 in the lens mount 3, slot 15 in a cover ring 16 and a further slot 17 in the camera body 1 so that the extreme end of the lever 11 then lies in the path of a cam 18 on a master setting member 19 (Fig. 4) mounted to rotate about an axis 20 nominally at right angles to the axis of the lens mount, the shutter operating means embodying the shutter driving and timing mechanism thus being mounted in a plane nominally parallel to but displaced from the lens axis.

The arm 6 shown in Figs. 1 to 3 is mounted so as to pivot freely on the shaft 10, which is supported in bearings 21 and 21' in the lens mount 3, and this arm 6 is spring loaded in an anticlockwise direction by means of a torsion spring 22, one arm of which reacts against a pin 23 on the lens mount 3 and the other arm on a lug 24 on the arm 6, such that the said arm 6 is normally held against a pin 25 (Fig. 2) also in the lens mount 3.

The lever 9 is rigidly attached to the shaft 10, adjacent to arm 6, and the lever 11 at the other end of the shaft is also rigidly attached to the said shaft whilst a spring 26 reacting between the lever 9 and arm 6 holds an abutment face 27 on the lever 9 against the lug 24 on the arm 6 (Fig. 3).

Referring now to Fig. 4, this shows the master setting member 19, which actuates the shutter blades, and the means by which the lens mounts are connected to the camera body.

The master setting member 19 is shown in Fig. 4 in its loaded condition in which a tension spring 28, one end of which is anchored at 29 to the camera body 1 and the other end to a lug 30 on the member 19, has been tensioned by pulling the member 19 about its axis 20 by suitable means, for example, in known manner by a conveniently arranged lug, similar to that employed in between-lens shutters.

The member 19 is held in its loaded condition by means of a pawl 31 engaging a detent latch 35 in the periphery of the said member 19; the pawl 31 forms part of the bell crank lever 32 pivoted at 33 to the camera body 1, the other arm 34 of the bell crank lever 32 being engaged by one arm 38 of a second bell crank lever 36 pivoted to the camera body at 37, the second arm 39 of which is moved by a plunger 40 when pressed by the finger to release the shutter.

The bell crank lever system 32, 36 and the plunger 40 are returned to their initial positions after actuation by means of a spring 41 attached to the bell crank lever 32 at one end and anchored to the camera body at the other end at 42.

To make an exposure, the button 40 is depressed, thereby releasing the member 19 through the bell crank lever system 32, 36 and pawl 31 and permitting the member 19 to move under the pull of the motor spring 28 so that the cam 18 engages and moves the lever 11 and, through the shaft 10, lever 9 and arm 6, opens the shutter blades 4.

The cam 18 passes beyond the lever 11 and the blades then close under the action of the arm 6 which is loaded by the spring 22 as previously described.

As the member 19 is reloaded, the cam 18 engages the reverse face of the lever 11 so that the shaft 10 rotates in an anticlockwise direction and the lever 9 moves back, also in an anticlockwise direction, against the spring 26, leaving the arm 6 firmly held against the pin 25 and the shutter blades closed, until cam 18 passes over the lever 11, permitting it to snap back into position to be engaged by cam 18 and open the shutter upon subsequent depression of the release button 40.

A normal type of gear retard train 43 is arranged around part of the periphery of the member 19, to provide a suitable delay to vary the shutter time exposure.

Further, although the camera may be used with different types of flashlamp, it is convenient to mount the flashlamp synchronising mechanism on the camera body 1 and for this purpose contacts making with variable time delays can be incorporated either in the gear retard train 43, or adjacent thereto as shown at 44, and arranged around the member 19, a particularly convenient form of synchroflash mechanism for use with the camera being that described in co-pending U. S. patent application Serial No. 120,386 of T. W. Clifford, L. Wright and N. S. Tilley, filed October 8, 1949, and now abandoned.

Fig. 4 also illustrates the manner in which the different lens mounts 3 are held in position on the camera body 1, the lens mounts being arranged to spigot into the aperture 2 at the front of the camera and to be locked in position by means of a bayonet fitting 45 on the lens mount entering through slots 46 formed in the front wall of the camera body. Rotation of the lens mount in a clockwise direction through a small angle clamps the lens rigidly to the camera as the bayonet fittings 45 move behind the camera wall.

The cover ring 16 is mounted behind tongues 48 on the bayonet fitting 45 and this ring 16 has projecting keys 47 which also engage the slots 46 and are held against rotation as the lens is rotated to be locked by the bayonet fitting.

The slot 15 in the ring 16 is thus held against rotation and, whilst the lens is rotated, the slot 14 in the lens mount 3 and the slot 12 in the lens mount member 13 are also brought into alignment with the slot 15, thereby permitting the lever 11 to move up into its normal position previously described with reference to Figs. 1 and 3, the lever 11 being held in the internal position in the lens mount, as shown in Fig. 2, whilst this is separated from the camera body.

To remove the lens from the camera, it is rotated in an anticlockwise direction, when viewed from the front of the camera to bring the bayonet fittings 45 into line with the slots 46 and, in so doing, the lever assembly 9, 11 carried on the mount 3 and the other slots in the lens mount and the lens mount member 13 are together rotated. By this action the lever 11 is wiped by the edge of slot 15 in the cover ring 16 beneath the inside surface of said ring 16, the inside slots then being covered by the ring, thereby preventing the lever 11 from being damaged whilst the lens is disconnected from the camera and also preventing the penetration of dust into the lens.

In order to change the different individual lenses without wastage of film it is necessary to cover the light sensitive photographic material whilst the lens is removed.

Fig. 5 illustrates the manner in which this is achieved. Two pivoted cover flap members 49 and 50 are mounted internally in the camera body, the member 49 being pivoted to the camera body at 51 and the member 50 at 52.

The two cover flaps are coupled together by means of a slot 53 in the member 50 which engages a pin 54 in the member 49 in such a manner that they move in reverse directions.

The cover flaps 49 and 50 are held in the closed position by means of a spring 55 coupled to pins 56 and 57 attached to each member respectively. The cover flap 49 has a pin 58 which is engaged by a slot 59 in the forked endpiece of an actuating lever 60 which lever is pivoted to the camera body at 61.

The lever 60 has an arm 62 which, as the lens mount 3 is fitted, lies in the path of a lens mount pin 63 carried by each of the said lens mounts such that as the mount is inserted into the camera body and rotated to lock the bayonet fitting 45 this pin 63 moves the lever 60 to cause the cover members 49 and 50 to open so that their front flaps 64 and 65 clear the beam from the lens to the sensitized material.

The initial movement of rotating the lens mount to remove it from the camera permits the cover flap members 49 and 50 to close before the mount is extracted from the camera.

The lens mount member 13 has a pin or, alternatively, is attached by screws to the lens mount 3 in such a way that it provides end location for the cover ring 16 and the lens mount 3 and carries keying means to key the focusing lens mount against rotation, as a focusing ring 66 (Fig. 1) of standard construction is rotated about the axis of the lens to focus to suit the subject to be photographed.

The shutter release mechanism embodying the master setting member 19 can be easily coupled together with standard film winding mechanism, if desired, to form a lock by means of which it is necessary to wind the film on after exposure before the shutter can be operated again, thus preventing double exposure of the same piece of film.

Furthermore, the focusing means 66 on the lens mounts may each have a corresponding cam which couples with a range finder and the iris 67 may be operated in known manner by a ring 68.

The individual mounts for the interchangeable lenses would normally be of different distance from the bayonet end 45 to the shutter blade and iris plane, involving different lengths of the shaft 10 carrying the levers 9 and 11, but a range of lenses all designed to have their shutter blade and iris plane in a common position in relation to the film plane could obviously be used equally well.

I claim:

1. A photographic camera comprising a camera body having an apertured front wall for receiving a lens mount, a lens mount having the rearward portion thereof seated in said wall aperture, a lens within said lens mount and including a plurality of lens components, shutter blades carried by said lens mount and located between a pair of adjacent lens components, a blade-operating ring, a spring-loaded arm coupled to said blade-operating ring for actuating the same, shutter operating mechanism supported by and within said camera body, and coupling means supported by and within said lens mount for operatively connecting said shutter means to said shutter operating mechanism; said coupling means including a shaft journalled in said lens mount with its axis parallel to the axis of the lens, lever arms secured to the forward and rearward ends of said shaft for cooperation with said spring-loaded arm and said shutter-operating mechanism respectively, and a spring yieldingly retaining said forward lever arm in contact with said spring loaded arm.

2. A photographic camera as recited in claim 1, wherein the shutter operating mechanism comprises shutter driving and timing mechanism mounted in a plane nominally parallel to but displaced from the lens axis.

3. A photographic camera as recited in claim 2, wherein said shutter operating mechanism comprises a master setting member, a tension spring loading said member, a gear retard train, and a bell-crank lever system releasing said master setting member from its loaded position upon operation of a push-button.

4. A photographic camera as recited in claim 1, wherein said spring loaded arm is journalled on said shaft.

5. A photographic camera as recited in claim 1, wherein said shaft terminates short of the rear end of said lens mount, said rearward portion of the lens mount is provided with a circumferential slot, and said rearward lever arm extends through said circumferential slot.

6. A photographic camera as recited in claim 5, wherein said rearward portion of the lens mount which seats within said wall aperture includes a barrel portion and a cover ring journalled thereon, said barrel portion and said cover ring being provided with circumferential slots through which the rearward lever arm extends for cooperative engagement with said shutter operating mechanism, and said slots are so relatively positioned that relative rotation of said barrel portion and said cover ring withdraws said rearward lever arm to lie within the cover ring for removal of the lens mount from the camera body.

7. A photographic camera as recited in claim 5, wherein said wall aperture provides a bayonet joint socket and has the transverse cross-section of a circle with diametrically disposed extensions, and said rearward portion of the lens mount is telescoped into said wall aperture and comprises a barrel portion on which a cover ring is journalled and a rear flange with diametrically located projections for locking said lens mount to said camera body upon a partial rotation of said barrel portion, said cover ring having lateral projections seated in the bayonet joint extensions of said wall aperture to secure said cover ring against rotation; and wherein said circumferential slot includes openings through said barrel portion of the lens mount and through said cover ring, said openings being radially alined on rotation of the barrel portion of the lens mount to lock the same to said camera body, and said opening through the barrel portion being closed upon rotation of said barrel portion to unlock the lens mount, whereby said rearward lever arm of the coupling means is located within and protected by said cover ring on removal of the lens mount from the camera body.

8. A photographic camera as recited in claim 1, wherein said rearward portion of the lens mount telescopes into the wall aperture and includes means operable upon a partial rotation of said lens mount to lock the same to the camera body; in combination with pivotally mounted cover means for excluding light from the sensitive photographic material on removal of the lens mount from the camera body, spring means continuously urging said cover means into light-excluding position, and means for moving said cover means into open position; said means including an actuating member mounted on said camera body and coupled to said cover means, and a cooperative element on said lens mount movable by a partial rotation of the lens mount in locking sense to displace said actuating member to open said cover means, whereby the reverse partial rotation of said lens mount to unlock the same from the camera body results in movement of said cover means into light-excluding position by said spring means prior to the initial movement of said rearward portion of the lens mount out of said wall aperture.

9. A photographic camera as recited in claim 8, wherein said actuating member is a lever pivoted on the camera body and having a pin-and-slot coupling of one end thereof to said cover means, and said cooperating element is a pin for engagement with the other end of said lever.

10. A photographic camera as recited in claim 9, wherein said cover means comprises two pivoted cover flaps having a pin-and-slot connection for effecting angular movements of said cover flaps in opposite sense; said lever being coupled to one of said cover flaps.

THOMAS WILLIAM CLIFFORD.

REFERENCES CITED

The following references are of record in the file of this patent:

UNITED STATES PATENTS

| Number | Name | Date |
| --- | --- | --- |
| 1,563,463 | Belugou | Dec. 1, 1925 |
| 2,117,971 | Mihalyi | May 17, 1938 |
| 2,396,869 | McDonald et al. | Mar. 19, 1946 |
| 2,474,378 | Simmon et al. | June 28, 1949 |

FOREIGN PATENTS

| Number | Country | Date |
| --- | --- | --- |
| 834,548 | France | Aug. 22, 1938 |
| 188,347 | Switzerland | Apr. 1, 1937 |